United States Patent

Yoshida et al.

[11] Patent Number: 5,832,331
[45] Date of Patent: Nov. 3, 1998

[54] IMAGE FORMING APPARATUS RESUMING AN INTERRUPTED IMAGE FORMING JOB WHEN POWER IS RESTORED AND AT TIMINGS DEPENDENT UPON DETECTION AND NON-DETECTION OF A NEW IMAGE FORMING JOB

[75] Inventors: Eiichi Yoshida; Yoichi Kawabuchi; Eiichiro Kawasaki, all of Toyokawa, Japan

[73] Assignee: Minolta Co., Ltd., Osaka, Japan

[21] Appl. No.: 835,397

[22] Filed: Apr. 7, 1997

[30] Foreign Application Priority Data

Apr. 8, 1996 [JP] Japan ................................ 8-085118
Apr. 8, 1996 [JP] Japan ................................ 8-085122

[51] Int. Cl.$^6$ ............................................. G03G 21/00
[52] U.S. Cl. ........................... 399/43; 399/38; 358/401; 358/404
[58] Field of Search ................... 399/43, 38; 358/401, 358/404, 437

[56] References Cited

U.S. PATENT DOCUMENTS 5,587,801 12/1996 Kamei et al. ............................ 358/296

FOREIGN PATENT DOCUMENTS 4-37916 2/1992 Japan.

Primary Examiner—R. L. Moses
Attorney, Agent, or Firm—McDermott, Will & Emery

[57] ABSTRACT

An image forming apparatus has a backup memory for storing data on image forming in a memory. When the power supply of the apparatus is turned off due to a trouble, a controller reproduces a status just before the power supply is turned off according to the data stored in the backup device if a predetermined time passes after the power supply is turned on again. However, new image forming is started if a preparation operation for new image forming is detected within the predetermined time. Further, if the power supply is turned off while a document is read, the controller reproduces the status just before the power supply is turned off when the power supply is turned on again.

17 Claims, 14 Drawing Sheets

IMAGE FORMING APPARATUS RESUMING AN INTERRUPTED IMAGE FORMING JOB WHEN POWER IS RESTORED AND AT TIMINGS DEPENDENT UPON DETECTION AND NON-DETECTION OF A NEW IMAGE FORMING JOB

BACKGROUND OF THE INVENTION

1. Field of the Invention

The present invention relates to an image forming apparatus such as a copying machine.

2. Description of the Prior Art

Recently, it is required to reduce energy consumption for equipments for office automation, electronic equipments and the like. For example, auto-power-off function is provided to an image forming apparatus such as a copying machine in order to turn off the power supply for the entire apparatus or a part thereof such as an operational panel. Then, power consumption is reduced when a non-use state without any operation continues longer than a predetermined time.

When an apparatus has the auto-power-off function to turn off the power supply for the entire apparatus, the power supply is turned off even if an operator is not before the apparatus automatically when the predetermined time passes after a trouble such as paper empty happens and prevents to continue image forming operation. In an ordinary image forming apparatus, image forming conditions such as paper size, number of copies, image density of an image to be printed are set at first. Then, when the operator returns before the apparatus, he or she turns on the power supply and fixes the trouble such as paper empty by supplying papers. Further, he or she has to set image forming conditions thereafter. This is inconvenient for the operator.

In order to solve this problem, a resume function is provided for an image forming apparatus. When the power supply is turned off by the auto-power-off function, data on image forming are saved in a backup memory. When the power supply is turned on again, a status just before the power supply is turned off is reproduced according to the data stored in the memory.

However, an operator who uses the image forming apparatus whose power supply is turned on again after the trouble is not necessarily the same operator who used the apparatus before the power supply is turned off. For example, it is assumed that when a trouble such as paper empty happens which prevents to continue image forming, the power supply is turned off while an operator is not before the apparatus. If the same operator turns on the power supply, the resume function is effective because the status just before the power supply is turned off is reproduced and the operator continues the image forming immediately after fixing the trouble. However, if a different operator turns on the power supply again, the image forming conditions reproduced by the resume function may be different from those requested by the different operator. In this case the operator has to set the image forming conditions after fixing the trouble. Thus, the resume function is inconvenient.

SUMMARY OF THE INVENTION

An object of the present invention is to provide an image forming apparatus having user-friendly resume function.

In an image forming apparatus according to the invention, a memory device is provided to store data on a status of the image forming apparatus, and a controller sets the image forming apparatus to have a status according to the data stored in the memory device when said power supply is turned on if data are stored in the memory device. However, if a detector detects a preparation operation for new image forming operation within a predetermined time after said power supply is turned on, the controller sets the image forming apparatus to perform the new image forming operation. In a modified invention, an image reader for reading a document is provided, and the controller makes the image forming apparatus perform a first operation if a document is under reading by the image reader and perform a second operation different from the first operation if a document is not under reading when the power supply is turned on.

An advantage of the invention is that a user can operate the image forming apparatus easily when a power supply of the apparatus is turned on after a trouble.

BRIEF DESCRIPTION OF THE DRAWINGS

These and other objects and features of the present invention will become clear from the following description taken in conjunction with the preferred embodiments thereof with reference the accompanying drawings, and in which.

DETAILED DESCRIPTION OF THE PREFERRED EMBODIMENTS

Figure 1:
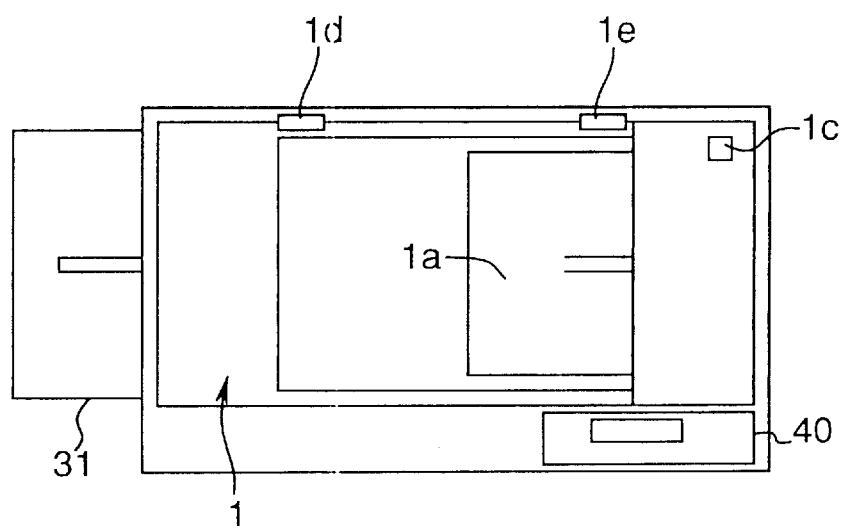
FIG. 1 is a top plan view of a digital color copying machine.
Figure 2:
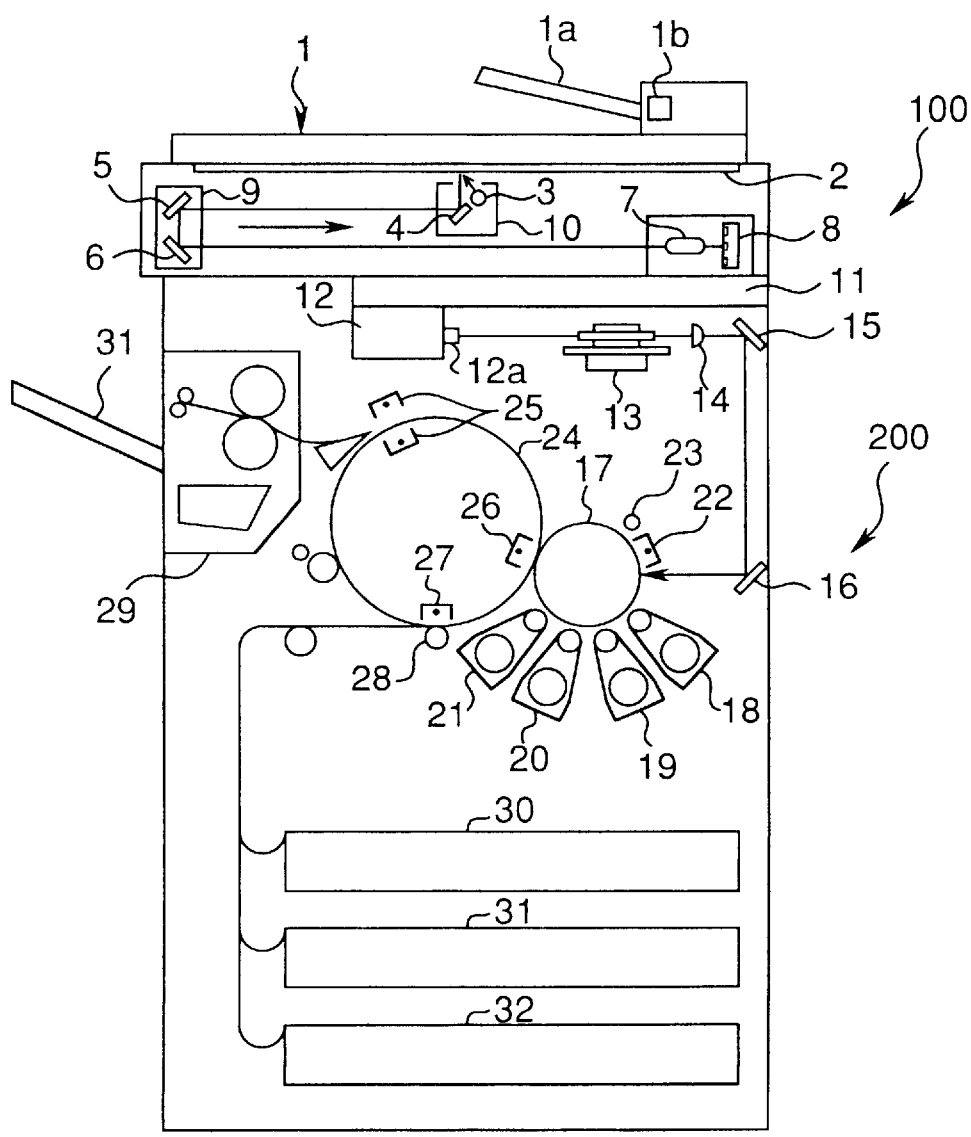
FIG. 2 is a sectional view of the copying machine.

Referring now to the drawings, wherein like reference characters designate like or corresponding parts throughout the views, FIGS. 1 and 2 show a top plan view and a section thereof of a digital color copying machine of a first embodiment of the invention. The copying machine comprises an image reader 100 for reading an image data on a document put on a platen glass 2 and a printer 200 for printing an image on a paper according to the image data read by the image reader 100.

An automatic document feeder 1 is provided on the image reader 100. The automatic document feeder 1 sends documents put on the document tray 1a one by one onto the platen glass 2 of the image reader 100. The document is read by the image reader 100. The automatic document feeder 1 is supported by support members 1d and 1e, and it can be opened upward to put a document manually on the platen glass 2. The automatic document feeder 1 has a sensor 1b for detecting a document on the document tray 1a and a sensor 1c for detecting opening of the automatic document feeder 1. An operational panel is also mounted at the top.

As shown in FIG. 2, in the image reader 100, a document on the platen glass 2 is illuminated by a lamp 3 mounted on a scanner 10. A light reflected from the document is propagated through mirrors 4, 5 and 6 and a lens 7 to be focused on a charge-coupled device (CCD) color sensor 8. The CCD color sensor 8 converts the reflected light to electric signals of red, green and blue to be sent to a signal processor 11. The scanner 10 is moved in a direction of an arrow shown in FIG. 2 (in the subscan direction) to scan the document at a speed of V and a mirror box 9 mounting the mirrors 5 and 6 are moved at a speed of V/2. The signal processor 11 converts the electric signals of red, green and blue to signals of cyan, magenta, yellow and black, and sends each color component of the converted data through an image memory 303 (FIG. 4) to a laser controller 12 in the printer 200.

In the printer 200, the laser controller 12 generates drive signals for a laser diode 12a according to the input signals. A laser beam emitted by the laser diode 12a propagates through a polygon mirror 13, f-θ lens 14 and mirrors 15 and 16 and scans a surface of a photoconductor drum 17 which have been charged uniformly by a sensitizing charger 22. Thus, a latent image is formed on the photoconductor drum 17. The latent image is developed by one of developing units 18–21 of cyan, magenta, yellow and black. Then, the toner image is transferred onto a sheet of paper on a transfer drum 24. The paper has been supplied from one of the paper cassettes 30, 31 and 32 to be absorbed onto the transfer drum 24 by a charger 27. This is repeated for each of the colors. Then, the surface of the transfer drum 24 is discharged by a charger 25, and the paper is separated from the transfer drum 24, fixed by a fixing unit 29, and discharged onto a tray 31.

Figure 3:
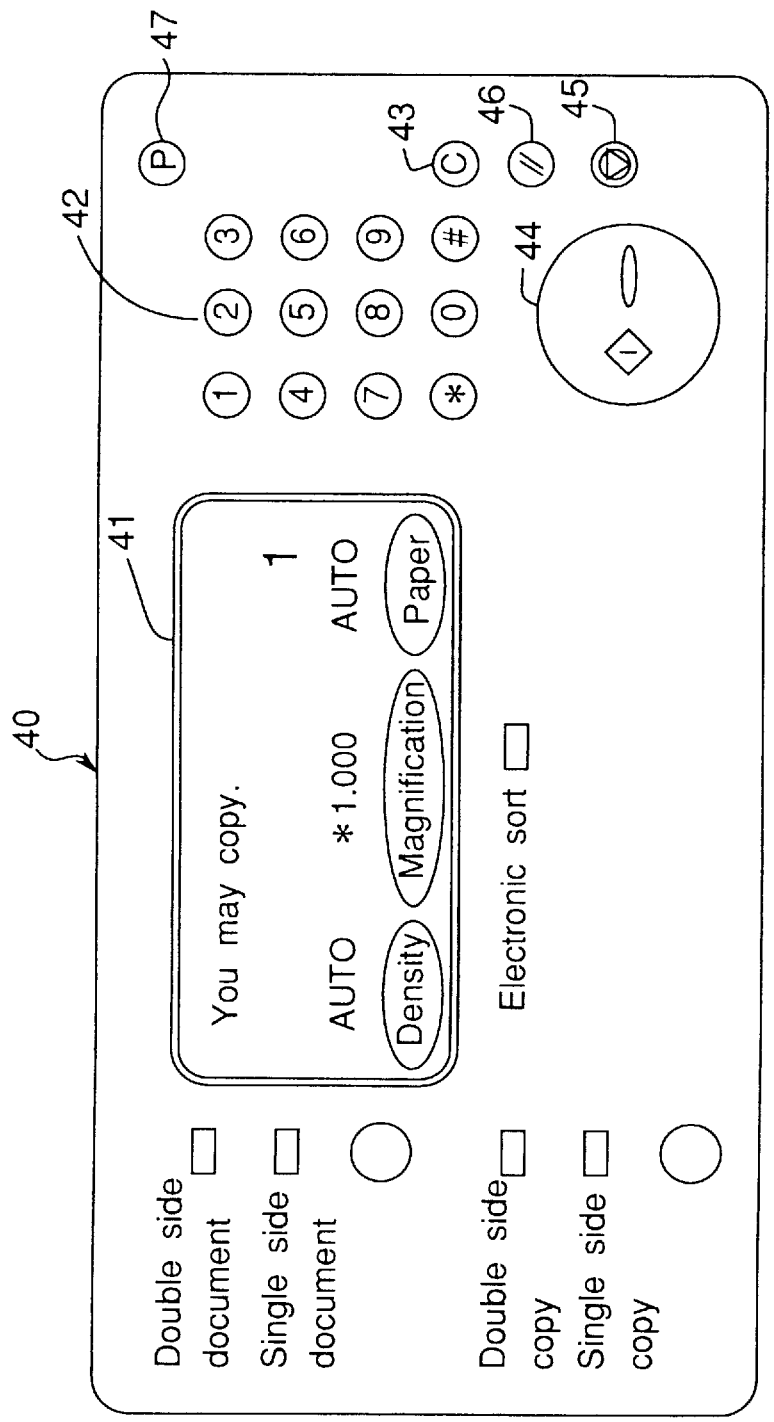
FIG. 3 is a plan view of an operational panel.

FIG. 3 shows the operational panel 40. In the operational panel 40, a liquid crystal touch panel 41 is provided to display messages on operation modes, paper jam or the like and to set an operation mode with touch. Ten-keys 42 are provided to set a number of copies, while clear key 43 is provided to reset the number of copies to one. Start key 44 and stop key 45 are provided to start and stop copy operation. Panel reset key 46 is provided to reset copying conditions at standard conditions. Power supply key 47 is provided to turning on or off a power supply 305 (FIG. 4) of the copying machine.

Figure 4:
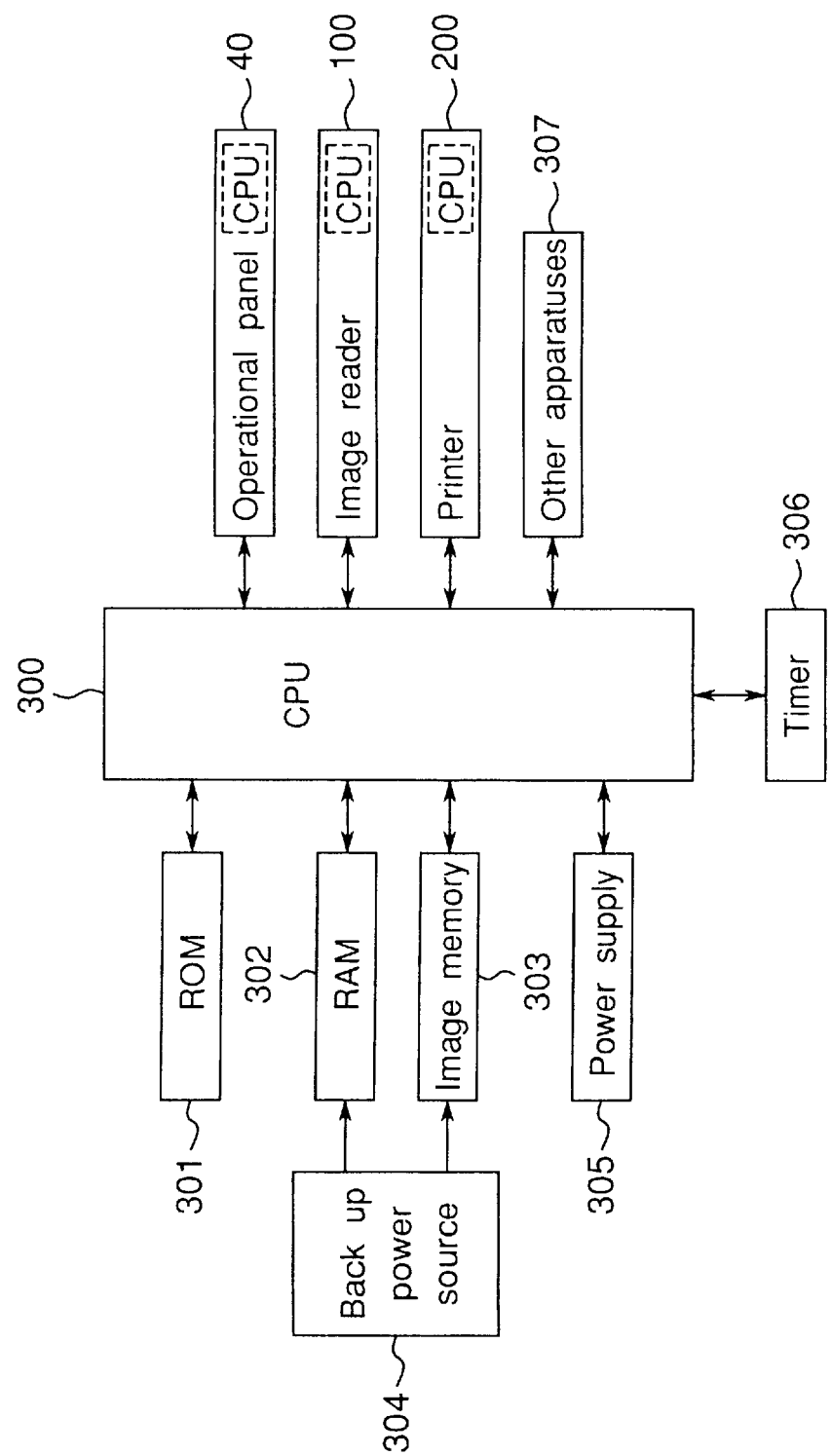
FIG. 4 is a block diagram of a controller of the copying machine.

FIG. 4 shows a controller of the copying machine having a central processing unit (CPU) 300. The CPU 300 is connected to a read only memory (ROM) 301 storing a control program, a random access memory (RAM) 302 storing copying condition data, and an image memory 303 storing image data of a plurality of documents temporarily. The image memory 303 has a capacity to store image data of fifty A4-size papers. A backup power source 304 is connected to the random access memory 302 and to the image memory 303. Each of the operational panel 40, the image reader 100 and the printer 200 has a central processing unit and communicates commands and data serially through a communication driver to the CPU 300. The power supply unit 305, a timer 306 and other apparatuses 307 are also connected to the CPU 300. The timer 306 counts timings for auto-power-off operation and for resume operation. The image data read by the image reader 100 is once stored in the image memory 303 and sent to the printer 200 in an order designated by an operator. The RAM 302 stores data on image forming such as data on image reading and parameters on copying mode. As will be explained later, the power supply 305 is turned off after copy interrupt continues for a predetermined time, but the data stored in the RAM 302 and in the image memory 303 are kept without destroyed by the backup power source 304. Instead of the backup power source 304, the RAM 302 and the image memory 303 may comprise nonvolatile memories, or the contents in the RAM 302 and the image memory 303 may be saved in a nonvolatile memory for backup.

The copying machine has auto-power-off function to turn off the power supply 305 automatically when a predetermined time passes after a trouble such as paper jam happens to interrupt copying operation, and it has resume function to resume the status just before the power supply 305 is turned off when the power supply 305 is turned on again except when a new copy job is started. When a trouble such as paper jam happens to interrupt copying operation while image data of a document is read, the resume function is started to perform again the reading operation by resuming the status just before the power supply 305 is turned off. When a trouble such as paper jam happens to interrupt copying operation while the printer 200 performs printing after image data of a document is read, the resume function is started to perform again the printing operation by resuming the status just before the power supply 305 is turned off.

The decision whether a new copy job is started or not is based on detection of an operation which can be regarded as preparation of a new job after the power supply 305 is turned on again. This operation is referred to as preparation operation. For example, the preparation operation is an operation for putting documents on the document tray 1a of the automatic document feeder 1, an operation for lifting the automatic docent feeder 1 used as a document cover to put a document on the platen glass 2 directly, or an operation to press any key of the operational panel 40 for setting copying mode. When a preparation operation is detected with a sensor or the like, it is decided that a new copy job is started.

Figure 5:
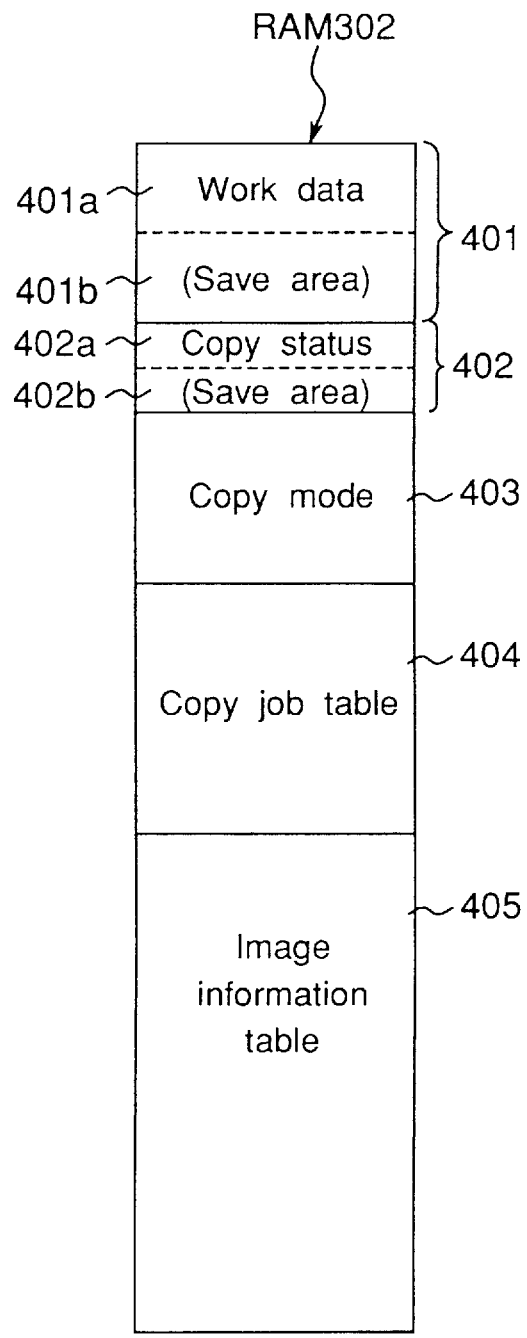
FIG. 5 is a memory map of a random access memory.

FIG. 5 shows a memory map of the RAM 302. The RAM 302 comprises a work data area 401 storing image-forming conditions of a program, a copy status area 402 storing statuses of the copying machine, a copy mode area 403 storing data on copy mode specified by an operator with the operational panel 40, a copy job table area 404 storing data such as the order for reading image data from the image memory 303, and an image information table area 405 storing information such as address, size or a data on image compression. A ratio of image reading for each document by the image reader 100 is written to the image information table 405. The ratio of image reading is 100% for a document when the image data of the entire document has been read and 50% for a document when a half of the image data of the entire document has been read when the power supply 305 is turned off. As mentioned above, the RAM 302 is connected to the backup power source 304, and the data in the RAM 302 is not vanished when the power supply 305 is turned off while a copy operation is interrupted by the auto-power-off function or the like.

The work data area 401 in the RAM 302 comprises an area 401a storing work data and a save area 401b storing backup data thereof. In the area 401a, parameters or the like for operating the program are stored. Similarly to the work data area 401, the copy status area 402 comprises an area 402a storing copy statuses data and a save area 402b storing backup data thereof. In the area 402a, parameters or the like on copying operation are stored. For example, when a document jam happens while it is fed in the automatic document feeder 1, a data on the document jam is written to the area 402a. When a paper jam happens in a paper-feed path in the printer 200 while copying operation is performed, a data on the paper jam is written to the area 402a. When the copying operation is completed normally, a data meaning wait of a new copy job is written to the area 402a.

The backup power source 304 keeps the data written to the work data area 401 and the copy status area 402 even when the power supply 305 is turned off. If the data is kept in the work data area 401 when the power supply 305 is turned on, the CPU 300 resumes the status of the copying state of the copying machine just before the power supply 305 was turned off according to the parameters stored in the work data area 402. In order to take a possibility of a new job into account when the power supply 305 is turned on again, the data in the areas 401a and 402a are saved in the save areas 401b and 402b, and the data in the areas 401a and 402a are cleared. When a preparation operation on a new job is detected, for example, when a new document is put on the document tray 1a, the CPU 300 first performs the new job. Then, the CPU 300 copies the data in the save areas 401b and 402b to the areas 401a and 402a to resume the status of the copying machine just before the power supply 305 is turned off.

Figure 6:
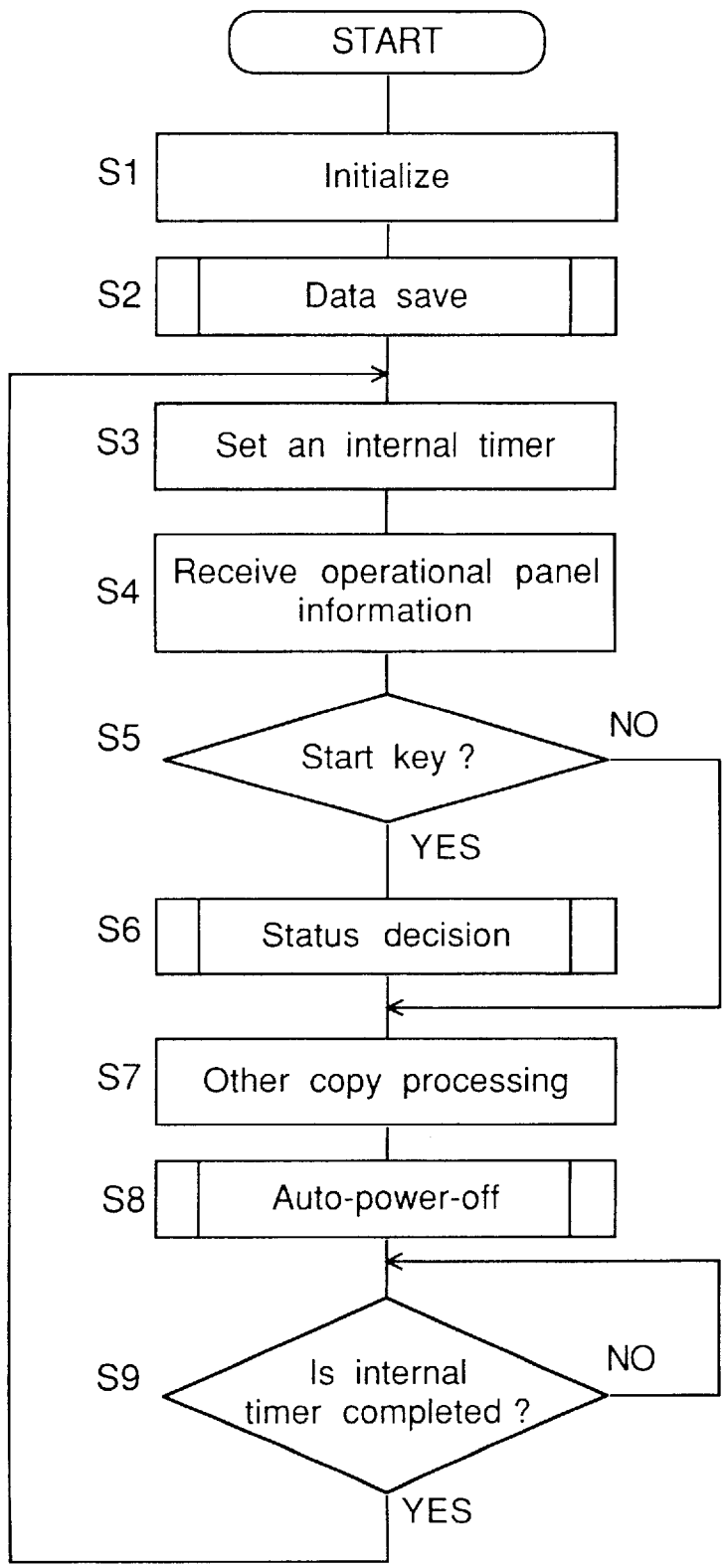
FIG. 6 is a main flowchart of copy operation.

FIG. 6 shows a main flow of the CPU 300 for controlling the copy operation. After the power supply 305 is turned on, registers and the like are initialized (step S1). Next, if the power supply 305 is decided to be turned off by the auto-power-off function in a copying operation, the data is saved according to the result for the resume function (step S2, refer to FIG. 7). Next, an internal timer for counting one routine is started (step S3). Then, a key-input of the operation panel 40 is received (step S4). When start key 44 is decided to be pressed (YES at step S5), status decision is performed (step S6, refer to FIG. 8), wherein it is checked how the power supply 305 was turned off, it is decided to start the resume function or not, and the contents of the resume function are determined if the resume function is started. If a key different from the start key 44 is pressed, the processing therefor is performed (step S7). Then, auto-power-off processing is performed to control a timing for the auto-power-off function (step S8). Next, after the internal timer is completed (YES at step S9), the flow returns to step S3.

Figure 7:
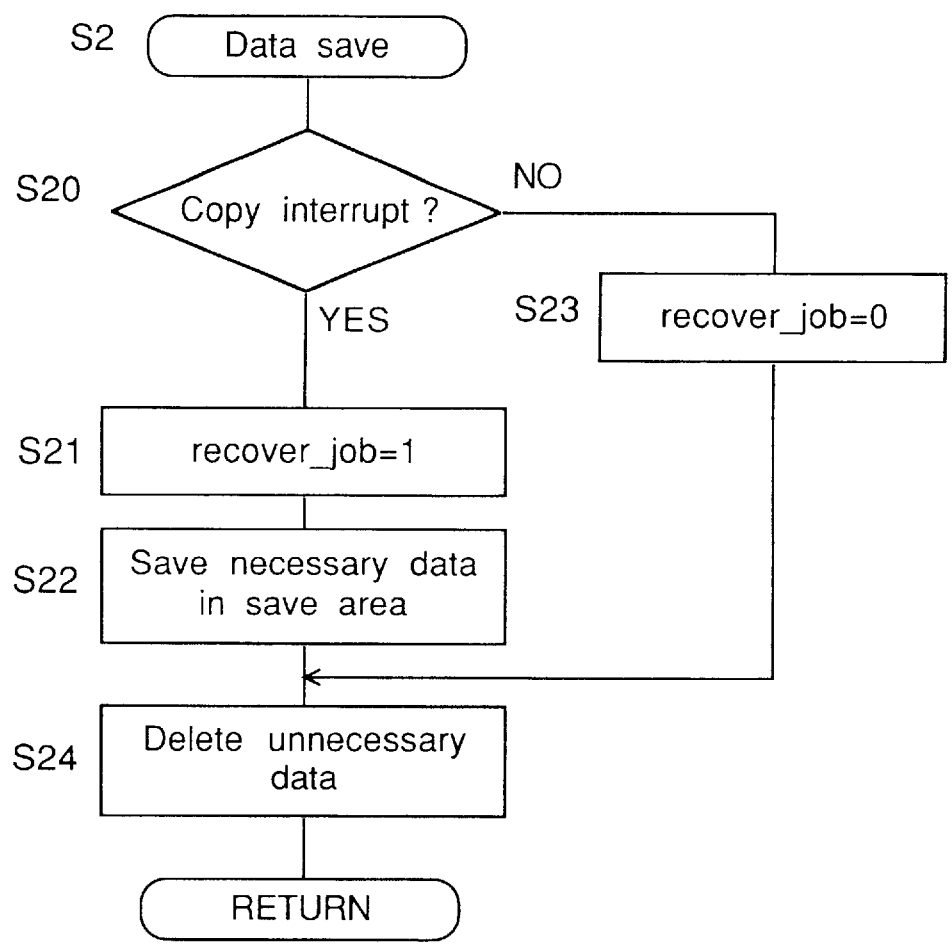
FIG. 7 is a flowchart of data save.

FIG. 7 shows a flow of the data save (step S2 in FIG. 6). First, if it is decided whether copy interrupt happens or copying is completed normally according to the data written to the copy status area 402a in the RAM 302 (step S20). If copying is decided to be interrupted (YES at step S20), a trouble happened and a predetermined time passed thereafter to interrupt copying by turning off the power supply 305. Then, recover_job flag is set at "1" to prepare the resume function (step S21), and the data in the areas 401a and 402a are saved to the areas 401b and 402b (step S22). On the other hand, if copy interrupt is not decided to happen (NO at step S20), or if a new job is waited, it is not necessary to perform resume function, and recover_job flag is set at "0" (step S23). Finally, the data stored in the areas 401a and 402a are cleared (step S24).

Figure 8:
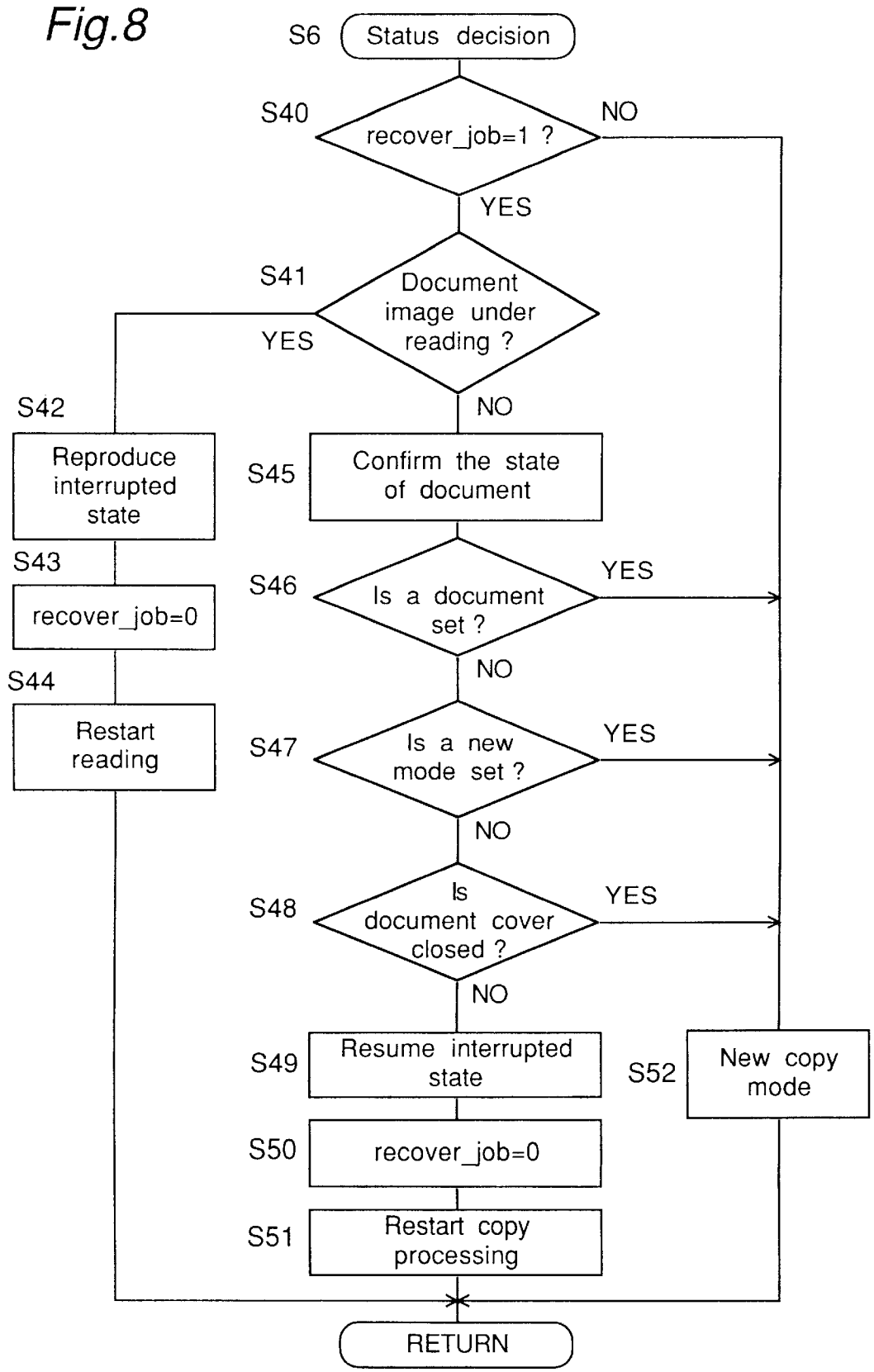
FIG. 8 is a flowchart of status decision.

FIG. 8 shows a flow of status decision (step S6 in FIG. 6). if recover_job flag is decided not to be "1" (NO at step S40), this means that the previous copying operation is completed normally, and an operation mode for a new copy job is set (step S52).

On the other hand, if recover_job flag is decided to be "1" (YES at step S40), this means that the power supply 305 was turned off by the auto-power-off function. Then, the status of the copying machine when copying was interrupted is checked according to the data written to the save area 402b in the copy status area 402 (step S41). For example, if it is decided that copying was interrupted while document image was read (YES at step S41), it is supposed that a document jam or the like happened during reading. Then, in order to resume the interrupted status, the data saved in the save area 401b in the work data area 401 is written to the work area 401a, and the data saved in the save area 402b in the copy status area 402 is written to the area 402a (step S42). Further, recover_job flag is reset at "0" (step S43), and reading of image data of the remaining documents are restarted (step S44).

Further, if it is decided that copying was not interrupted while document image was read (NO at step S41), this means that a paper jam or the like happened in the printer 200. Then, the status of the document is confirmed (step S45). The document set on the automatic document feeder 1 or on the platen glass 2 is detected-by the sensor 1b in the document tray 1a or by the image data obtained a prescan performed before the image data for copying is read. The document may also be checked by a sensor (not shown) provided below the platen glass 2. If it is decided that a new document is put on the document tray 1a or on the platen glass 2 (YES at step S46), if a new copy mode is decided to be set with the operational panel 40 (YES at step S47), or if the automatic document feeder 1 is decided to be opened with the sensor 1c (YES at step S48), a new copy mode is set (step S52). Otherwise the data saved to the save area 401b in the work data area 401 is written to the work area 401a and the data saved to the save area 402b in the copy status data area 402 is written to the copy status area 402a, and the interrupted status is resumed (step S49), and recover_job flag is reset at "0" (step S50). Then, the copy operation is restarted in the printer 200 (step S51).

As explained above, in the image forming apparatus having resume function of the embodiment, an operation, which is performed by an operator when a new image forming is started, is detected as preparation operation (steps S46–S48). Then, when a preparation operation is detected, the resume function is canceled automatically without any further operation, and the new image forming is started readily (step S52). Further, if the power supply was turned off while a document image was read (YES at step S41), the reading operation is continued automatically when the power supply is turned on again (step S44). Then, image forming is performed quickly. Therefore, this embodiment makes the operation for the image forming apparatus easy.

Figure 9:
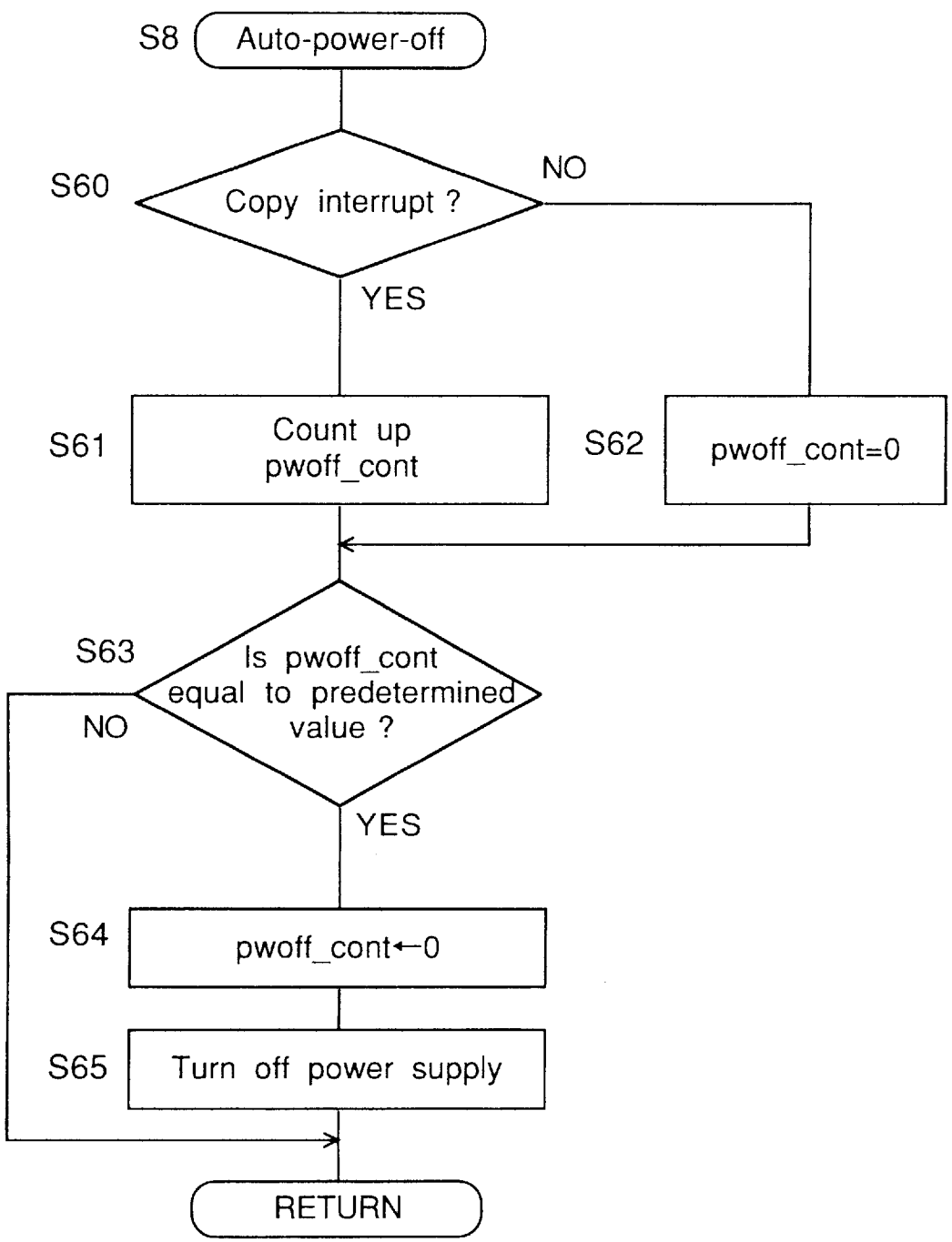
FIG. 9 is a flowchart of auto-power-off.

FIG. 9 shows a flow of the auto-power-off (step S8 in FIG. 6). It is decided according to the data written to the copy status area 402 in the RAM 302 whether copy operation was interrupted or not (step S60). If it is decided that copy operation was interrupted (YES at step S60), pwoff_cont which counts the timing for starting the auto-power-off function is incremented (step S61). On the other hand, if it is not decided that copy operation was interrupted (NO at step S60), or if the copy operation was completed with no trouble, pwoff_cont is reset at "0" (step S62). Next, if it is decided that pwoff_cont is increased to a predetermined value (YES at step S63), or if the copy interrupt continues for the predetermined time, pwoff_cont is reset at "0" (step S64), and a control signal is sent to the power supply 305 to turn off the power supply 305 (step S65). On the other hand, if it is not decided that pwoff_cont is increased to a predetermined value (NO at step S63), the flow returns readily to the main flow. As explained above, the power supply 305 is turned off automatically when the predetermined time passes after copy interrupt happens.

Figure 10:
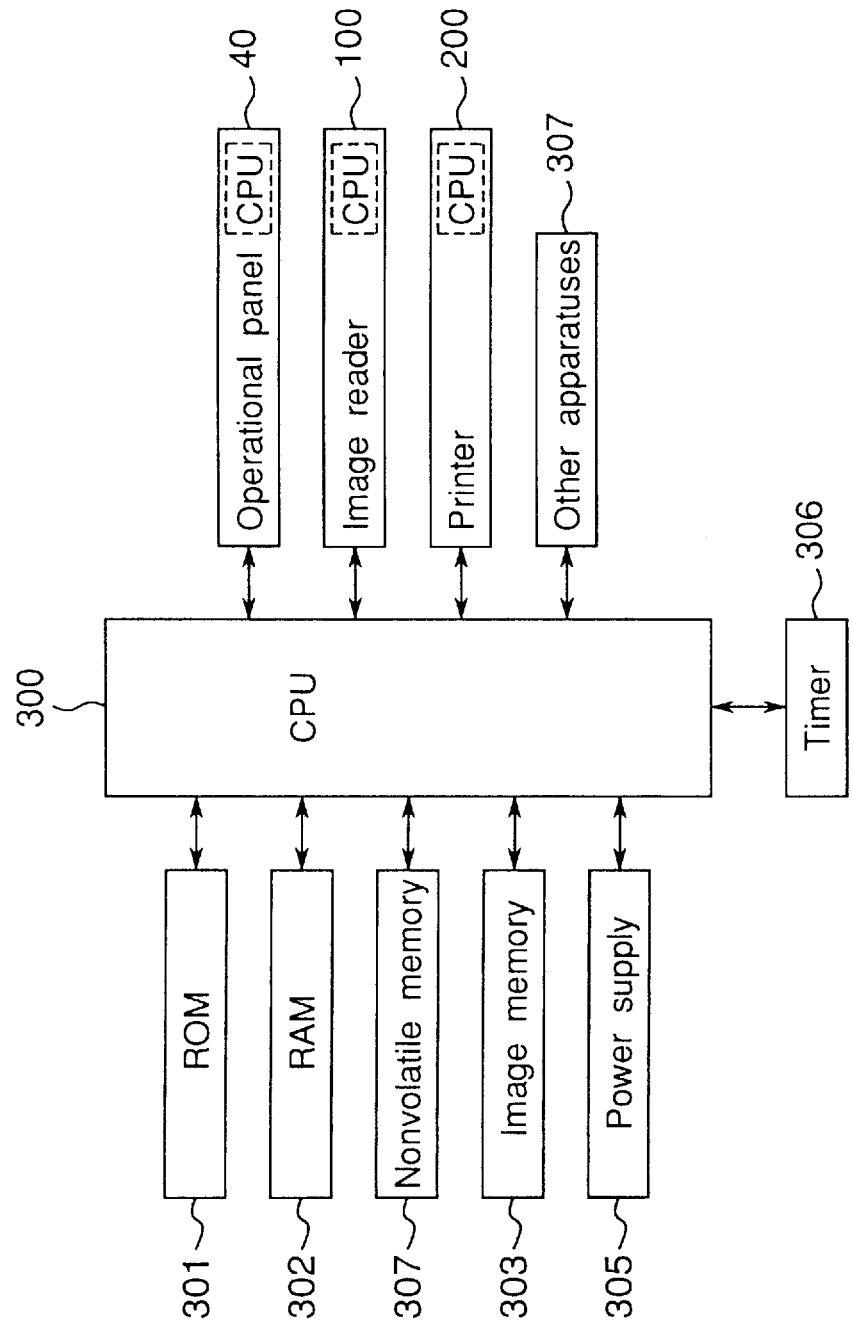
FIG. 10 is a block diagram of a controller of the copying machine of a second embodiment.

Next, a digital color copying machine of a second embodiment of the invention is explained. The copying machine has the same structure as shown in FIGS. 1–3. FIG. 10 shows a controller of the copying machine having a central processing unit (CPU) 300. This controller is similar to that of the first embodiment shown in FIG. 4, but the memory devices are different. A RAM 302 and an image memory 303 are connected to the CPU 300, similarly to FIG. 4, but a nonvolatile memory 307 for backup is also connected to the CPU 300 instead of providing the backup power source 304. As explained below, when the power supply 305 is turned off by the auto-power-off function, the data on image forming, that is, the data on copying conditions stored in the RAM 302 and the image data stored in the image memory 303, are transferred to the nonvolatile memory 307. When a predetermined time passes after the power supply 305 is turned on again, the data in the nonvolatile memory 307 is transferred to the RAM 302 and to the image memory 303 to reproduce the status just before the power supply 305 was turned off.

In this embodiment, when an operator turns off the power supply 305 manually with the power supply switch 47 in the operational panel 40, the data stored in the RAM 302 and in the image memory 303 are not transferred to the nonvolatile memory 307. However, it is also possible to modify the embodiment to transfer the data in the RAM 302 and the image memory 303 to the nonvolatile memory 307 when an operator turns off the power supply 305 manually.

Figure 11:
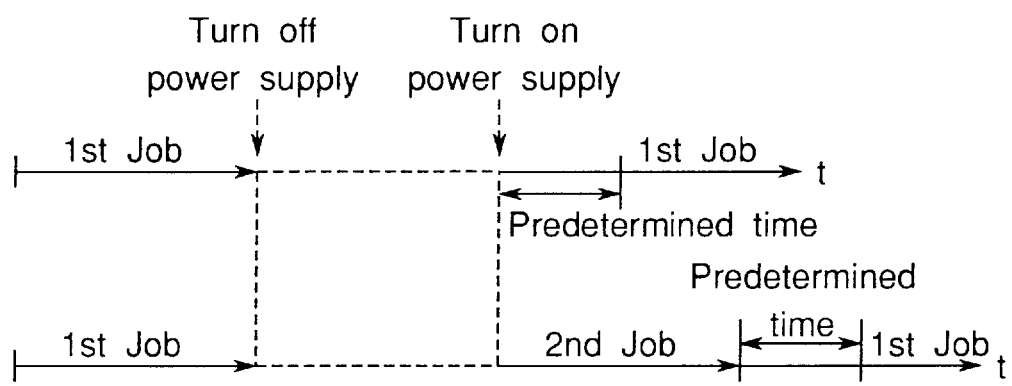
FIG. 11 is a timing chart for illustrating resume function.

FIG. 11 shows a timing chart for illustrating resume function. After the power supply is turned off in a copy operation (first job) due to auto-power-off, it is turned on again. Normally, as shown in the upper side in FIG. 11, when a predetermined time passes after the turning-on, the contents of the first job are reproduced by the resume function. On the other hand, as shown in the lower side in FIG. 11, if the power supply is turned on again for a new second job by a different operator, when a predetermined time passes after the completion of the second job, the contents of the first job are reproduced by the resume function. Therefore, the different operator can set and perform the second job quickly without resetting the first job. Because it is waited that a predetermined time passes after the completion of the second job, a further new job is given a timing to be started before the predetermined time passes.

Figure 12:
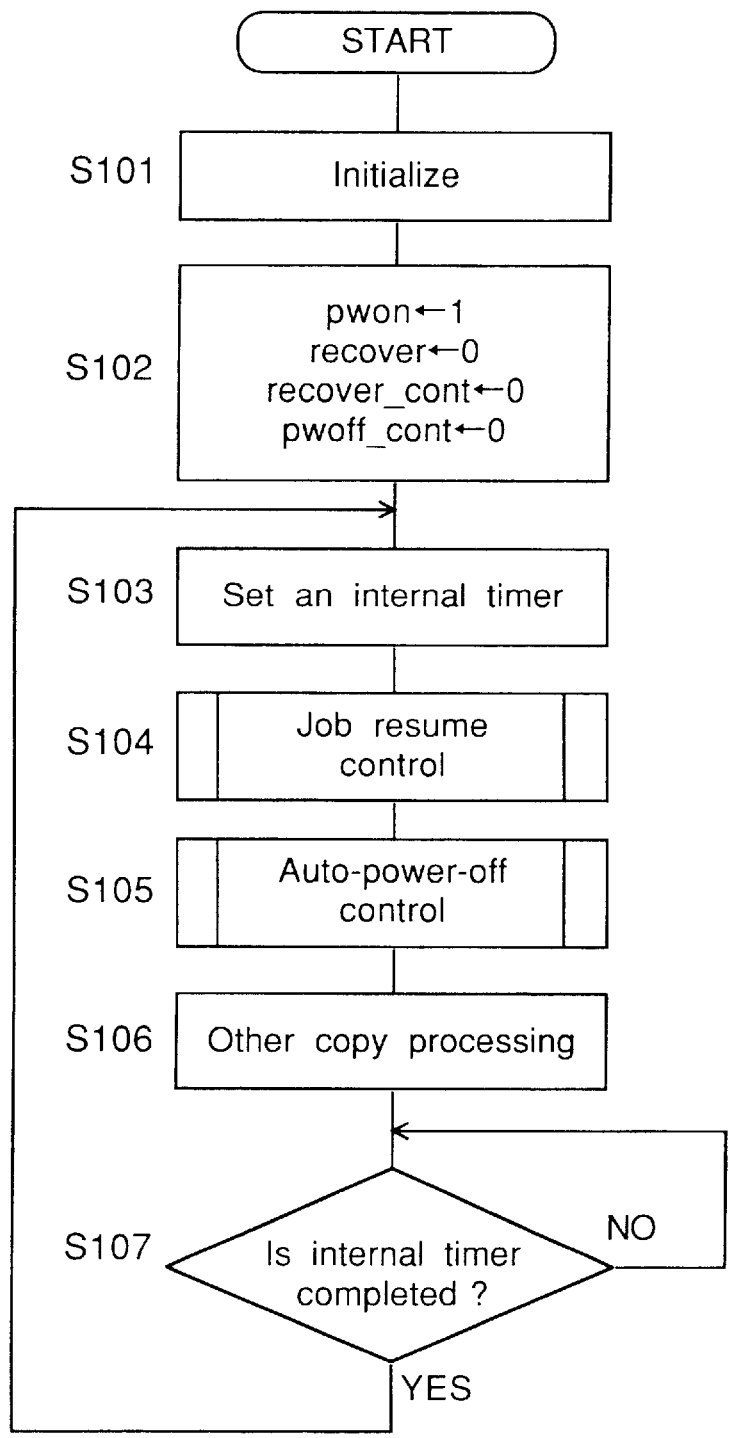
FIG. 12 is a main flowchart of the second embodiment.

FIG. 12 shows a main flow of the CPU 300 for controlling the copy operation. After the power supply 305 is turned on, the RAM 302, the timer 306 and the like are initialized (step S101). Then, variables are initialized (step S102). That is, pwon flag which represents on/off of the power supply 305 is set at "1". Further, recover flag which represents whether to operate the resume function or not is set at zero, and a value of recover_cont for counting a timing to operate the auto-power-off function and a value of pwoff_cont for counting a timing to operate the resume function are also set at zero. The two timings are controlled by using the timer 306.

Figure 13:
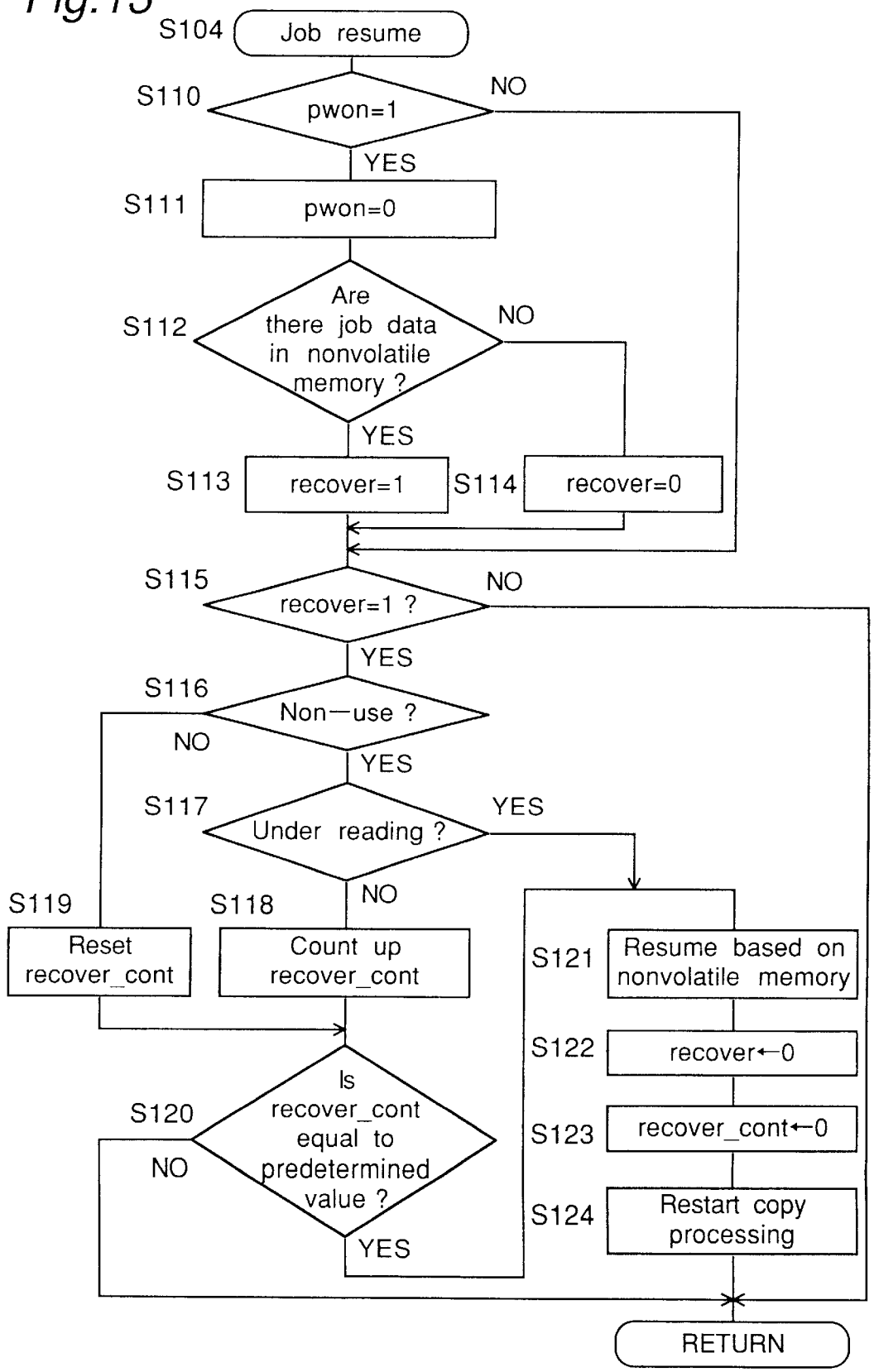
FIG. 13 is a flowchart of job resume.

Next, an internal timer for determining one routine is started (step S103), and job resume control is performed (step S104, refer to FIG. 13). That is, when a certain time passes after the power supply 305 is turned on again in the non-use state, the status just before the power supply 305 was turned off is reproduced, and the copy operation is restarted. However, a now job is prepared within the certain time, the new job is started first and the resume function is performed thereafter. Further, the timing to operate the auto-power-off function is controlled (step S105, refer to FIG. 14). Then, after the internal timer is completed (YES at step S107), the flow returns to step S103.

FIG. 13 shows a flow of the job resume control (step S104 in FIG. 12). If pwon flag is decided to be "1" (YES at step S110), this means that the power supply 305 is just turned on. Then, after pwon flag is reset at "0" (step S111), it is decided to operate the resume function or not. If it is decided that job data on copying conditions and image data exist in the nonvolatile memory 307 (YES at step S112), recover flag is set at "1" to perform resume function (step S113), otherwise it is reset at "0" (step S114). Then, the flow proceeds to step S115. On the other hand, if pwon flag is decided not to be "1" (NO at step S110), the flow proceeds readily to step S115.

Next, it is decided at step S115 whether recover flag is "1" or not. If the recover flag is decided not to be "1" (NO at step S115), the flow returns to the main flow readily. On the other hand, if the recover flag is decided to be "1" (YES at step S115), the resume function is performed to reproduce the status just before the power supply was turned off (steps S121–S124) unless a non-use state is continued for a predetermined time until the count value of recover_time becomes a predetermined value (YES at step S120). If a preparation operation such as any key-input in the operational panel 40 is detected (NO at step S116), this means that a new copy job is prepared, and recover_cont is reset at zero (step S119). In this case, the resume function is operated when a predetermined time passes after the new copy job is completed. On the other hand, if it is decided that a non-use state is continued, it is decided next if a document is under reading (step S117). If it is decided that a document is decided to be kept on the document tray 1a (YES at step S117), or the document is under reading, this means that a trouble such as paper jam happened to start the auto-power-off function. Then, the resume function is started readily. However, if it is decided that a non-use state is continued and that a document is decided not to be under reading (NO at step S117), the value of the recover_cont is incremented to count the predetermined time (step S118), and the flow returns to the main flow. When the count value of recover_cont becomes equal to a predetermined value (YES at step S120), the resume function is operated. That is, the copy conditions saved and the image data in the non-volatile memory 307 are transferred to the RAM 302 and to the image memory 303 (step S121), to reproduce the status just before the power supply 305 was turned off. Then, recover flag is reset at "0" (step S122), and the value of recover_cont is reset at zero (step S123). Next, the copy processing is restarted in the reproduced status (step S124). As explained above, when a certain time passes after the power supply 305 is turned on again in the non-use state, the status just before the power supply 305 was turned off is reproduced, and the copy operation is continued.

In the flow explained above, if it is decided that a document is under reading when the power supply 305 is turned on again (YES at step S117), the resume function is started readily. However, it is also possible to discharge all the document remained on the tray when the power supply 305 is turned on again.

Figure 14:
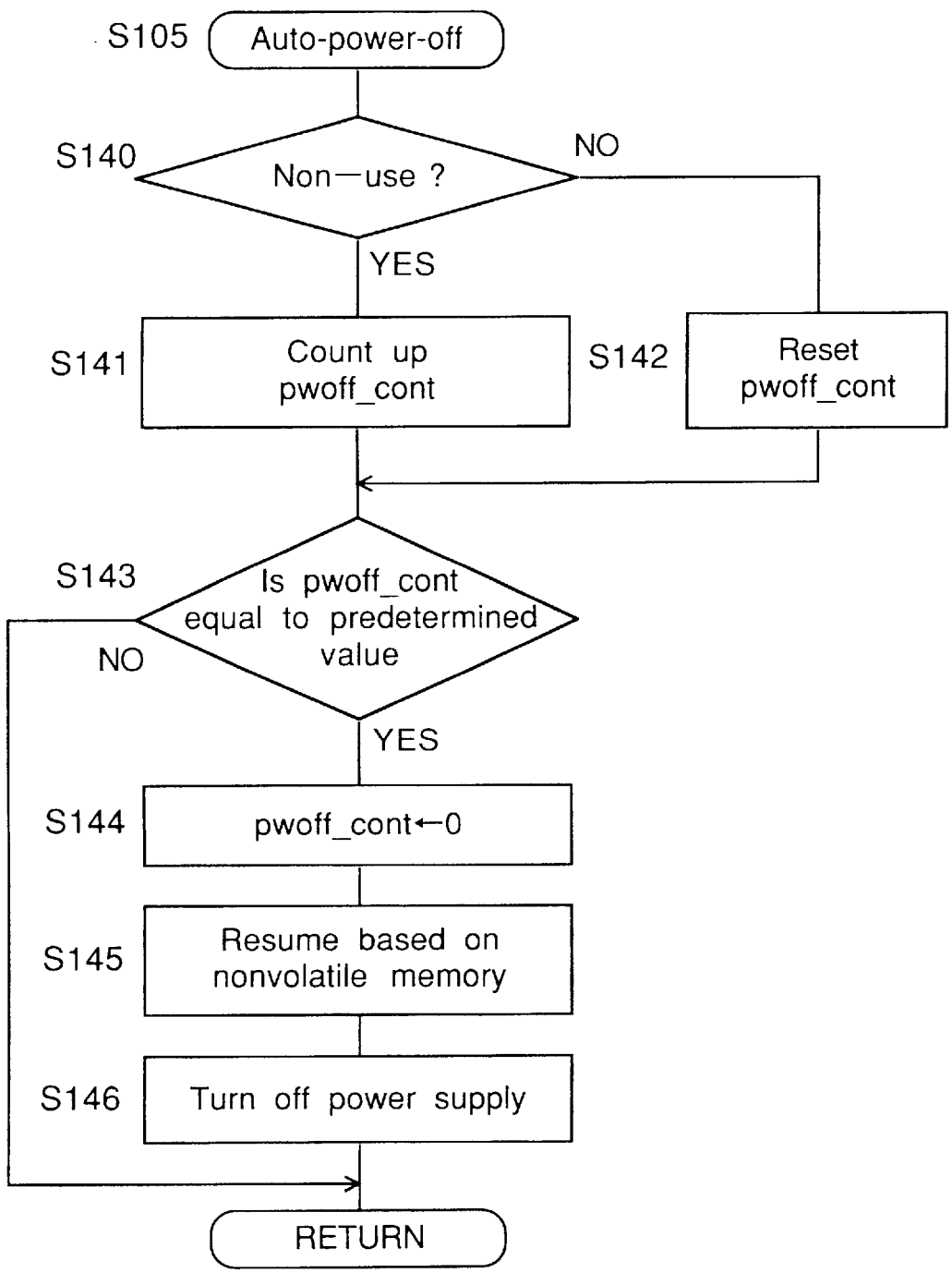
FIG. 14 is a flowchart of the auto-power-off.

FIG. 14 shows a flow of the auto-power-off control (step S105 in FIG. 12). It is decided first whether the copying machine is in the non-use state or not (step S140). If the copying machine is decided to be in the non-use state (YES at step S140), the value of pwoff_cont is incremented to count a predetermined time (step S141). On the other hand, if the copying machine is decided not to be in the non-use state (NO at step S140), for example if any key in the operational panel 40 is touched, the value of pwoff_cont is reset at zero (step S141), and the flow returns to the main flow.

Next, if it is decided that pwoff_cont is increased to a predetermined value (YES at step S143), or if the copy interrupt continues for the predetermined time, the value of pwoff_cont is reset at zero (step S144), the copy conditions and the image data saved in the non-volatile memory 307 are transferred to the RAM 302 and the image memory 304 (step S145), and a control signal is sent to the power supply 305 to turn off the power supply 305 (step S146). On the other hand, if it is not decided that pwoff_cont is increased to a predetermined value (NO at step S143), the flow returns readily to the main flow.

In the copying machine explained above, in the auto-power-off processing, the copy conditions and the image data saved in the non-volatile memory 307 are transferred to the RAM 302 and the image memory 304 (step S145). However, the RAM 302 and the image memory 304 may have backup battery, as in the first embodiment. In this case, it is not needed to transfer data to the non-volatile memory 307, and the data are saved even when the power supply is turned off instantly.

Further, in the copying machine explained above, copy operation is restarted by the resume function automatically when a predetermined time passes after reproducing the status just before the power supply was turned off. However, it may be possible to request to an operator to select to restart the copying operation or not.

As explained above, after non-use state is confirmed for a predetermined time, the resume function is performed to reproduce the status just before the power supply is turned off. Then, an opportunity is given to a user to start a new job within the predetermined time. Then, new copying conditions and new image reading can be started without resetting image forming conditions or erasing image data. Therefore, this embodiment facilitates to set new image forming conditions or to read new image data quickly.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus comprising:

a power supply of the image forming apparatus;

a memory device storing data on a status of the image forming apparatus;

a detector detecting a preparation operation for new image forming operation; and a controller setting the image forming apparatus to perform the new image forming operation when said power supply is turned on if data are stored in said memory device and the preparation operation is detected by said detector, and setting the image forming apparatus to have a status according to the data stored in said memory device when said power supply is turned on if data are stored in said memory device and the preparation operation is not detected by said detector.

2. The image forming apparatus according to claim 1, further comprising:

an input device to input a data on image forming, wherein said detector detects the preparation operation by detecting the data is input with said input device.

3. The image forming apparatus according to claim 1, further comprising:

an image reader including a platen glass and an image sensor for reading a document put on said platen glass, wherein said detector detects the preparation operation by detecting a document put on said platen glass.

4. An image forming apparatus comprising:

a power supply of the image forming apparatus;

an image reader reading a document;

an image forming device forming an image based on data on the document read by said image reader;

a memory device storing data on a status of the image forming apparatus and image data of the document read by said image reader; and a controller making said image forming device perform a first operation if a document is being read by said image reader and perform a second operation, different from the first operation, if a document is not being read when said power supply is turned on.

5. The image forming apparatus according to claim 4, wherein the first operation performed by said controller is an operation for completing an interrupted read operation by said image reader.

6. The image forming apparatus according to claim 4, wherein the second operation is an operation for setting the image forming device in a status based on the data stored in said memory device.

7. The image forming apparatus according to claim 4, wherein said controller turns off said power supply automatically when a predetermined time passes after image forming is interrupted.

8. The image forming apparatus according to claim 7, further comprising:

a detector for detecting a document to be read by said image reader, wherein the second operation is an operation for setting the image forming device in a status based on the data stored in said memory device when said detector detects the document to be read.

9. The image forming apparatus according to claim 8, wherein said image reader includes a platen glass and an image sensor for reading a document put on said platen glass, and said detector detects the document to be read by said image reader by detecting the document on said platen glass.

10. The image forming apparatus according to claim 8, wherein said image reader includes a document cover and an image sensor for reading a document put on a platen glass covered by said document cover, and said detector detects the document to be read by said image reader by detecting that said cover is moved.

11. The image forming apparatus according to claim 8, further comprising:

an input device to input data on image forming, wherein the second operation performed by said controller is an operation for setting the image forming apparatus in a status based on the data input by said input device.

12. An image forming apparatus comprising:

a power supply of the image forming apparatus;

a memory device storing data on a status of the image forming apparatus;

a controller setting said image forming apparatus in a state based on the data stored in said memory device when a predetermined time passes after said power supply is turned on.

13. An image forming apparatus comprising:

a power supply of the image forming apparatus;

an input device to input data on image forming condition;

a memory device storing data on a status of the image forming apparatus; and a controller setting the image forming apparatus in a state based on the data stored in said memory device when said input device is not operated for a predetermined time after said power supply is turned on.

14. The image forming apparatus according to claim 13, wherein said controller turns of f said power supply when a predetermined time passes after image forming in the image forming apparatus is interrupted.

15. The apparatus according to claim 13, wherein said controller sets the image forming apparatus in a status based on the data store in said memory device when said input device is not operated for a predetermined time after said input device is operated after said power supply is turned on.

16. An image forming apparatus comprising:

a power supply of the image forming apparatus;

a memory device storing data on a status of the image forming apparatus;

a detector detecting a preparation operation for new image forming operation; and a controller setting the image forming apparatus to perform the new image forming operation when said power supply is turned on if data are stored in said memory device and the preparation operation is detected by said detector, and setting the image forming apparatus to have a status according to the data stored in said memory device when said power supply is turned on if data are stored in said memory device and the preparation operation is not detected by said detector, wherein said controller turns off said power supply automatically when a predetermined time passes after image forming in the image forming apparatus is interrupted.

17. An image forming apparatus comprising:

a power supply of the image forming apparatus;

a memory device storing data on a status of the image forming apparatus;

a detector detecting a preparation operation for new image forming operation;

a controller setting the image forming apparatus to perform the new image forming operation when said power supply is turned on if data are stored in said memory device and the preparation operation is detected by said detector, and setting the image forming apparatus to have a status according to the data stored in said memory device when said power supply is turned on if data are stored in said memory device and the preparation operation is not detected by said detector; and an image reader including a document cover and an image sensor for reading a document put on a platen glass covered by said document cover, wherein said detector detects the preparation operation by detecting that said cover is moved.

* * * * *

UNITED STATES PATENT AND TRADEMARK OFFICE
CERTIFICATE OF CORRECTION

PATENT NO. : 5,832,331
DATED : November 3, 1998
INVENTOR(S) : Yoshida et al.

It is certified that error appears in the above-identified patent and that said Letters Patent is hereby corrected as shown below:

In the Claims:

Claim 11, line 1, change "8" to --7--.

Signed and Sealed this

Twenty-fifth Day of April, 2000

Attest:

Q. TODD DICKINSON

Attesting Officer

Director of Patents and Trademarks